United States Patent
Kulkarni et al.

(10) Patent No.: US 9,491,056 B1
(45) Date of Patent: Nov. 8, 2016

(54) METHODS AND APPARATUS FOR PROTOCOL INDEPENDENT MODEL TO PROVIDE EVENT-BASED DISCOVERY

(71) Applicants: Mallari Mohanrao Kulkarni, Bangalore (IN); Stalinsaravanakumar Thangapalam, Bangalore (IN); Sathianantha Thilagar Thomas, Bangalore (IN); Christopher Chaulk, Franklin, MA (US)

(72) Inventors: Mallari Mohanrao Kulkarni, Bangalore (IN); Stalinsaravanakumar Thangapalam, Bangalore (IN); Sathianantha Thilagar Thomas, Bangalore (IN); Christopher Chaulk, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 450 days.

(21) Appl. No.: 13/730,037

(22) Filed: Dec. 28, 2012

(51) Int. Cl.
G06F 15/173 (2006.01)
H04L 12/24 (2006.01)
G06F 11/20 (2006.01)
G06F 3/06 (2006.01)

(52) U.S. Cl.
CPC ............ H04L 41/12 (2013.01); G06F 3/067 (2013.01); G06F 3/0689 (2013.01); G06F 11/201 (2013.01); G06F 11/2089 (2013.01); G06F 11/2094 (2013.01)

(58) Field of Classification Search
CPC combination set(s) only.
See application file for complete search history.

(56) References Cited

U.S. PATENT DOCUMENTS

| | | |
|---|---|---|
| 6,985,983 B2 | 1/2006 | Pellegrino et al. |
| 7,051,101 B1 | 5/2006 | Dubrovsky et al. |
| 7,194,538 B1 * | 3/2007 | Rabe ............... G06F 3/0605 709/220 |
| 7,203,730 B1 | 4/2007 | Meyer |
| 7,509,400 B1 | 3/2009 | Tanner et al. |
| 7,512,754 B1 | 3/2009 | Chaitanya et al. |
| 7,685,261 B1 * | 3/2010 | Marinelli et al. ............. 709/220 |
| 7,743,178 B2 | 6/2010 | Warren et al. |
| 7,885,256 B1 * | 2/2011 | Yenamandra et al. ........ 370/389 |
| 7,921,190 B2 | 4/2011 | Tanner et al. |
| 2002/0089689 A1 | 7/2002 | Ferlitsch et al. |
| 2002/0162059 A1 | 10/2002 | McNeeley et al. |
| 2003/0220986 A1 | 11/2003 | Thakor |
| 2004/0054690 A1 * | 3/2004 | Hillerbrand et al. ....... 707/104.1 |
| 2005/0138040 A1 * | 6/2005 | Lamb et al. ................... 707/100 |
| 2005/0138316 A1 * | 6/2005 | Groves et al. ................ 711/170 |
| 2006/0069868 A1 | 3/2006 | Nonaka et al. |
| 2006/0230218 A1 | 10/2006 | Warren et al. |
| 2008/0126584 A1 | 5/2008 | Mullis et al. |
| 2009/0080461 A1 | 3/2009 | Barri et al. |
| 2012/0151355 A1 | 6/2012 | Butt et al. |
| 2012/0166748 A1 | 6/2012 | Satoyama et al. |
| 2013/0159359 A1 | 6/2013 | Kumar et al. |
| 2015/0019199 A1 | 1/2015 | Andrews et al. |

OTHER PUBLICATIONS

De Vergara, JE Lopez, Victor A. Villagra, and Julio Berrocal. "Semantic Management: advantages of using an ontology-based management information meta-model." Proceedings of the HP Openview University Association Ninth Plenary Workshop (HPOVUA'2002), Boblingen, Germany. 2002.*
U.S. Appl. No. 13/536,357 Response filed Jul. 10, 2014 13 pages.

(Continued)

*Primary Examiner* — Chris Parry
*Assistant Examiner* — Caroline Jahnige
(74) *Attorney, Agent, or Firm* — Daly, Crowley Mofford & Durkee, LLP

(57) ABSTRACT

Methods and apparatus for providing a storage resource management application having a protocol independent model for event-based discovery. In response to an event, discovery is performed using a protocol independent ontology model.

18 Claims, 17 Drawing Sheets

(56) References Cited

OTHER PUBLICATIONS

U.S. Appl. No. 13/536,357, filed Jun. 28, 2012, Jain, et al.
"Phosphere Discovery and Monitoring for the Modern Data Center", White Paper, Aug. 2011, $EMC^2$, 17 pages.
"Phosphere: Next Generation Storage Resource Management", White Paper, Aug. 2011, $EMC^2$, 13 pages.
Vblock Infrastructure Platforms Series 300 Architecture Overview, Version 2.4, Aug. 2011, The Virtual Computing Environment Company, www.vce.com, 74 pages.
Cisco Unified Computing System and EMC VNXe3300 Unified Storage System, White Paper, Jan. 2011, Revision 1.0, $EMC^2$, Cisco Systems, Inc., 170 West Tasman Drive, San Jose, CA 95134-1706, www.cisco.com, 9 pages.
EMC Integrated Infrastructure for VMware Enabled by EMC VNXe3100 and VMware vSphere 4.1, An Architectural Overview, White Paper, EMC Global Solutions, $EMC^2$, Feb. 2011, 24 pages.
VMWare vStorage APIs for Array Integration with EMC VNX Series for NAS, Benefits of EMC VNX for File Integration with VMware VAAI, White Paper, EMC Solutions Group, Jan. 2012, $EMC^2$, 17 pages.
Vblock™ Infrastructure Platforms 2010 Vblock Platforms Architecture Overview, Version 1.3, Nov. 2011, The Virtual Computing Environment Company, www.vce.com, 25 pages.
Best Practices for Deploying VMware vCloud Director on Vblock Infrastructure Platforms, Sep. 2011, The Virtual Computing Environment Company, www.vce.com, 20 pages.
Service Catalog Strategies for Vblock™ Infrastructure Platforms, IaaS COE, Jan. 2011, The Virtual Computing Environment Company, www.vce.com, 19 pages.
Unified Infrastructure Manager/Provisioning, © 2011 VCE Company, The Virtual Computing Environment Company, www.vce.com, 3 pages.
Vblock™ Infrastructure Platforms Technical Overview, © 2011 VCE Company, The Virtual Computing Environment Company, www.vce.com, 8 pages.
Vblock™ Solution for Trusted Multi-Tenancy: Technical Overview, Aug. 2011, The Virtual Computing Environment Company, www.vce.com, 75 pages.
U.S. Appl. No. 13/536,357, filed Jun. 28, 2012.
U.S. Appl. No. 14/037,663, filed Sep. 26, 2013, Thangapalam, et al.
Office Action in U.S. Appl. No. 13/536,357 dated Feb. 25, 2014, 24 pages.
Notice of Allowance for U.S. Appl. No. 14/037,663, filed Sep. 26, 2013.
U.S. Appl. No. 13/536,357 Office Action dated Sep. 18, 2014, 22 pages.
Office Action dated Jun. 23, 2015; for U.S. Appl. No. 13/536,357; 22 pages.
U.S. Appl. No. 13/536,357 Notice of Allowance dated Jan. 4, 2016 12 pages.

\* cited by examiner

METHODS AND APPARATUS FOR PROTOCOL INDEPENDENT MODEL TO PROVIDE EVENT-BASED DISCOVERY

BACKGROUND

As is known in the art, storage area networks (SANs) can include a variety of different components and those components can be provided by different vendors. For example, storage network elements provide management information through various protocols: CISCO switches communicate via SNMP protocol, NAS (e.g., EMC Celerra) components communicate via Celerra XML API and arrays communicate via SMI-S. It can be challenging to communicate with components in the network using the different protocols.

SUMMARY

In one aspect of the invention, a method comprises: receiving an event, creating a discovery job in response to the event, initiating the discovery job with a discovery collector, and performing discovery of a device using a protocol independent ontology model, wherein the device comprises a first one of an array in a storage layer, a switch in a network layer, a host in a compute layer, and a NAS device, wherein the device can be accessed by different protocols.

In another aspect of the invention, an article comprises: a computer-readable medium containing non-transitory stored instructions that enable a machine to perform: receiving an event, creating a discovery job in response to the event, initiating the discovery job with a discovery collector, and performing discovery of a device using a protocol independent ontology model, wherein the device comprises a first one of an array in a storage layer, a switch in a network layer, a host in a compute layer, and a NAS device, wherein the device can be accessed by different protocols.

In a further aspect of the invention, a system comprises: at least one processor, and at least one memory coupled to the at least one processor, the at least one processor and the at least one memory configured to: receive an event, create a discovery job in response to the event, initiate the discovery job with a discovery collector, and perform discovery of a device using a protocol independent ontology model, wherein the device comprises a first one of an array in a storage layer, a switch in a network layer, a host in a compute layer, and a NAS device, wherein the device can be accessed by different protocols.

BRIEF DESCRIPTION OF THE DRAWINGS

The foregoing features of this invention, as well as the invention itself, may be more fully understood from the following description of the drawings in which.

DETAILED DESCRIPTION

In general, exemplary embodiments of the invention support multiple protocols for management of storage network elements in a virtualized storage resource management (SRM) application that provides an end-to-end view across abstraction layers. A protocol independent ontology model enables focused discovery and management of the storage network elements. In exemplary embodiments using an ontology model, each request/method call to a data provider is modeled as an operation for any protocol.

Figure 1:
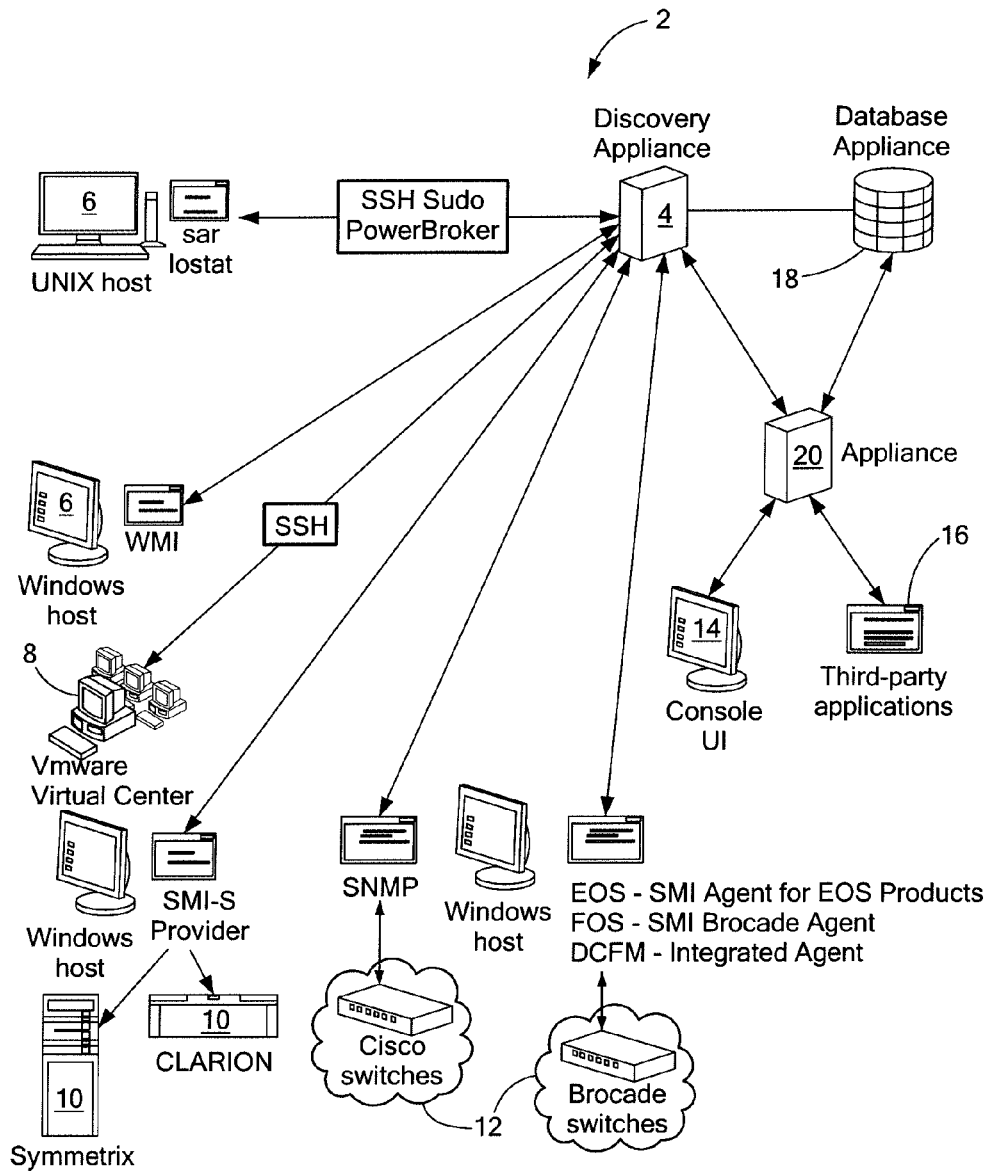
FIG. 1 is a pictorial schematic of a SRM discovery application having protocol independent model for event-based discovery in accordance with exemplary embodiments of the invention.

FIG. 1 shows an exemplary system 2 having an SRM application with protocol independent model for event based discovery. The system 2 includes a discovery appliance 4 that includes discovery engines to provide scalable discovery and monitoring. In addition to handling large SANs, the discovery appliance supports the discovery of elements deployed in multiple network zones. Discovery appliance(s) 4 act as an aggregation point for collected data for reducing the network connectivity requirements to the host collecting the data to the host that the data is being collected from. Element discovery is achieved using multiple standards-based protocols. The illustrative system 2 includes elements such as hosts 6, virtual center 8, arrays 10, switches 12, user interface 14, applications 16, database appliance 18, and SRM appliance 20.

The discovery component entities reside on the discovery appliance 4. Domain manager (DM) components transform source information models into a DMTF Common Information Model (CIM) based information model, maintaining their data in memory. This data is then migrated to the SRM appliance 4. DMs periodically persist their data in repository files (.rps). Some components that are written in java, for example, collect discovered data and do not persist it locally. In exemplary embodiment, each data collection component supports a specific protocol (e.g. CIM/XML, SNMP) configured to collect information instances in the source format (e.g. CIM/XML) and transfer that data stream to the appliance 4 with no transformation or inspection of the data, other than syntax checking (e.g. testing for well-formed XML). In some cases, as with SNMP, where there is no standard or de facto standard for a serialization format of the information model. In this case, the data is transformed into a specific format before transfer (e.g. jSON). This simple "pull-and-post" pattern enables data collections to be written quickly, as very little processing is required before the write. This also allows for high scalability, as each component is specifically written to minimize CPU and memory utilization. The methods used to achieve this include data streaming, which enables more instances and threads to run in parallel to achieve high throughput for discovery. These components are based on a flexible framework, which also facilitates the creation of new components by third parties (e.g. service organizations). Discovery components post their results to the appliance 4 using SSL-enabled HTTP (i.e. HTTPS) connections. In the appliance 4, the data is serialized to disk with multiple threads parsing and transforming the discovered elements into Resource Description Framework (RDF) statements that are then persisted in a topology service, which maintains an embedded RDF database. This results in information that is mapped and normalized to a standard data model. This enables flexible and efficient support for any source data model (e.g. SMI-S, SNMP MIB).

The following simple example shows how SMI-S CIM/XML data is translated into an RDF statement. The CIM/XML comes from an instance of a CIM_ComputerSystem class, which describes a host.

CIM/XML
<KEYBINDING NAME="SystemCreationClassName">
  <KEYVALUE
    VALUETYPE="string">CIM_ComputerSystem</
    KEYVALUE>
</KEYBINDING>
<KEYBINDING NAME="SystemName">
  <KEYVALUE
    VALUETYPE~"string">Iglor229.1.ss.xxx.com</
    KEYVALUE>
</KEYBINDING>

The resulting RDF statement creates a host object in the topology service with a name of "Iglor229.1ss.xxx.com". The response for an RDF database query for instances of host objects would have this host included in its list of host objects. The appliance 4 surfaces the discovered information to the application components through the topology service. Discovery profiles support two types of profiles to enable discovery, access and discovery. Access profiles encapsulate the credentials used to authenticate and authorize access to a SAN element. This access profile is then associated with a discovery profile that specifies the hostname(s)/IP (e.g., SAN element or the element's management host). The combination is then used to detect and discover an element. Discovery may be scheduled to occur on a regular interval. Discovery will also occur based on asynchronous events that are generated as the result of changes to the elements. These events include SNMP traps and CIM indications. By default, full rediscoveries occur on a static schedule (daily for hosts and weekly for switches and storage arrays).

Data collection includes a detection phase and a discovery phase. The detection phase validates the ability of the discovery engine to communicate with the software representing the element. The discovery phase collects the element information. The SAN element needs to be associated with the discovery and access profiles appropriate for their type. For example, SMI-S access profiles are required for the array discovery components that provide an SMI-S interface. The discovery engine uses the information provided to enumerate and report the name and type of elements it has discovered. Discovery services then assign components responsibility for discovering the detected elements.

Figure 1A:
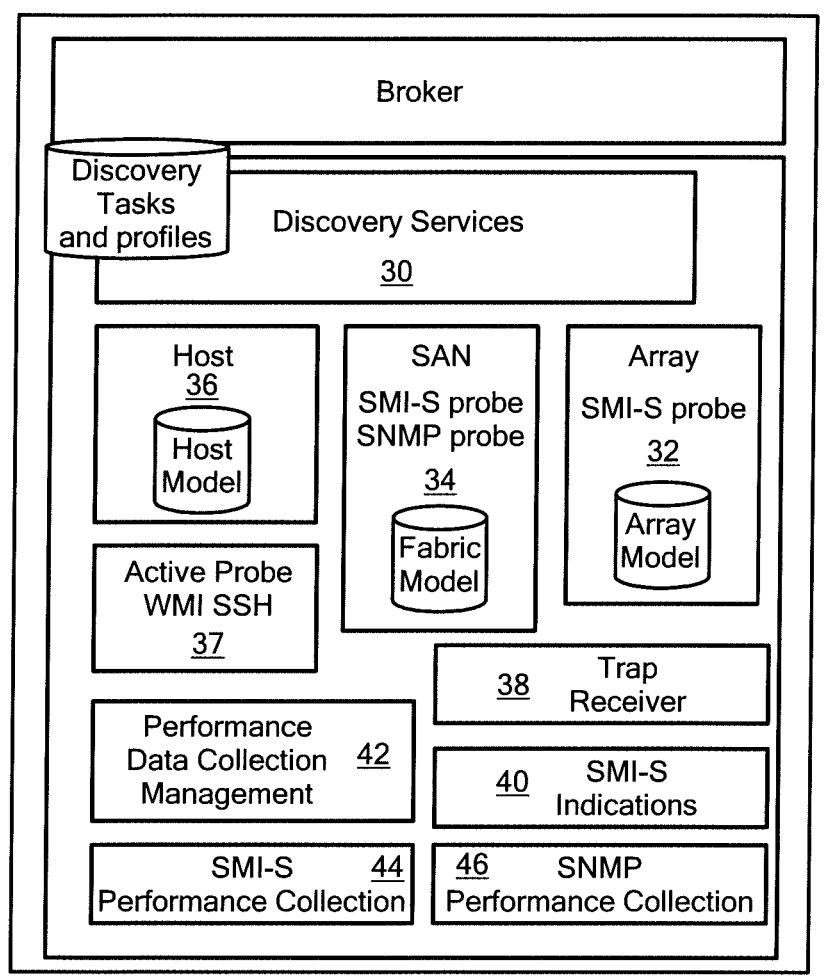
FIG. 1A is a block diagram of a discovery engine for the SRM discovery application of FIG. 1.

FIG. 1A shows exemplary components in a discovery engine in the appliance 4. Discovery services 30 run within the context of a path domain manager component. The first discovery engine deployed has the responsibility of coordinating discovery of all discovery components in the discovery appliances 4. An array domain manager 32 is responsible for the discovery of topology and configuration information for storage arrays. It supports the CIM/XML protocol and SMI-S profiles. A SAN domain manager 34 is responsible for the discovery of topology and configuration of SAN switches and fabrics. It supports both SMI-S (for Brocade and McDATA switches) and SNMP based discovery (Cisco), for example. A host domain manager 36 is responsible for the coordination of discovery of hosts by an active probe component 37. The active probe component leverages WMI and SSH to connect to Windows (WMI), UNIX (SSH) and Linux (SSH) hosts. These two components communicate with each other using HTTP(S). A trap listener 38 and indications listener 40 are responsible for listening to asynchronous SNMP traps and CIM Indications. Asynchronous events trigger rediscovery, alert management and compliance use cases. Performance data collection components 42 are responsible for the collection and coordination of performance data from storage arrays, SAN switches and hosts. Performance data collection component uses communication protocol based plug-in modules to interface with respective elements or element managers to collect data. SMI-S 44 and SNMP Performance Collection 46 are such plug-ins for respective communication protocols. These plug-ins are controlled by a data collection services (data collection service and data collection thread manager service).

In general, the SRM application is standards-based meaning that technologies leveraged internally and exposed externally should be standards based. The primary protocols in use are SMI-S for storage element discovery, SNMP for network devices, and WMI and SSH for host discovery. The standards used in the implementation cover both standard protocols (HTTP, SSL) as well as commonly deployed architectural principles (e.g. REST). The primary communication protocol in a RESTful architecture is HTTP, with SSL (i.e. HTTPS) implemented to provide secure communication and authorization between network endpoints. Components communicate via HTTPS. The formats used in the exposure of information are also based on standards such as Atom and JSON.

Managed objects, from a storage array to a user, are resources that are modeled, discovered, managed, and exposed using the most appropriate technology. A HTTP URI (Uniform Resource Identifier) uniquely identifies resources. Note that a URL is a network locator reference, or address of the resource. A resource name is just the name or identifier of the resource. The term URI applies to both of these terms, as both the location of the URL and the name of the URN are unique. HTTP URIs exists in Semantic Web applications that leverage RDF. An HTTP URI is used to identify an object uniquely, within the context of the application. Each resource in the system has a type, which is again uniquely identified by another URI. This includes storage elements (e.g. storage volume, storage port, HBA, switch port), as well as application infrastructure entities (e.g. log file, service, process). All of the instances of these resource types comprise the information model.

Properties, expressed as URIs, are used to associate types and instances of these types. When instances are discovered (e.g. storage array) a unique HTTP URI is created which identifies this new instance, a resource URI. With this newly minted URI, the resource instance can now be associated with other instances and statements may be made about the resource (e.g. "storageArray1 is Located in Houston").

Information about resources is exposed using the standards-based representation (e.g. Atom feeds etc.) most appropriate for the task to be accomplished. For example, a list of storage arrays is easily acquired and then divided into discrete pages, by using Atom Feed pagination. A collection of performance metrics for an entire day is most compactly expressed using JSON or CSV.

The system utilizes an event-driven architecture related to Service Oriented Architecture (SOA) to promote the coordination of loosely coupled components to provide intelligent data processing and enable highly scalable systems. In an event-driven architecture, messages representing events are communicated point-to-point or across a shared bus. Components use these messages to trigger analysis and other processes, usually emitting additional messages to communicate state changes.

The system uses messages to communicate including:
The existence of events such as storage element modifications;
Exceptional state changes (e.g. port down);
State changes in processing (e.g. discovery complete)
State changes of resources (e.g. entity created, entity updated, entity deleted)
State changes of system components;
Alert creation and modification
Breach or violation of configured policy or rules By decoupling the message and the processing related to the message, components can be distributed and aggregated to provide high availability and scalability. Because the interface to the component is a message, any number of components or threads can be deployed to process these messages concurrently, thus increasing the throughput of the system.

Complex Event Processing (CEP) services can be layered over this foundation to create a highly scalable and flexible framework to analyze events generated in a data center in near real-time to provide greater insight and clarity into storage related events. In exemplary embodiments, CEP technology is used to analyze large volumes of performance metrics against performance thresholds, in order to produce events that ultimately result in the creation of alerts. The event-driven architecture and CEP allow large volumes of events (thousands per second) to be processed. This enables near realtime results that can notify a storage administrator as soon as a problem is detected, regardless of the size of the environment under management.

In exemplary embodiments, the SRM application is distributed as a virtual appliance (vApp) that can be deployed and managed through industry standard tools provided by VMware or other virtualization application. Scaling the system is as simple as deploying additional virtual machines (VMs) and distributing the processing among them. Data is federated among VMs using a simple, but secure, mechanism that runs over HTTP using SSL (i.e., HTTPS) and standard TCP ports.

Figure 1B:
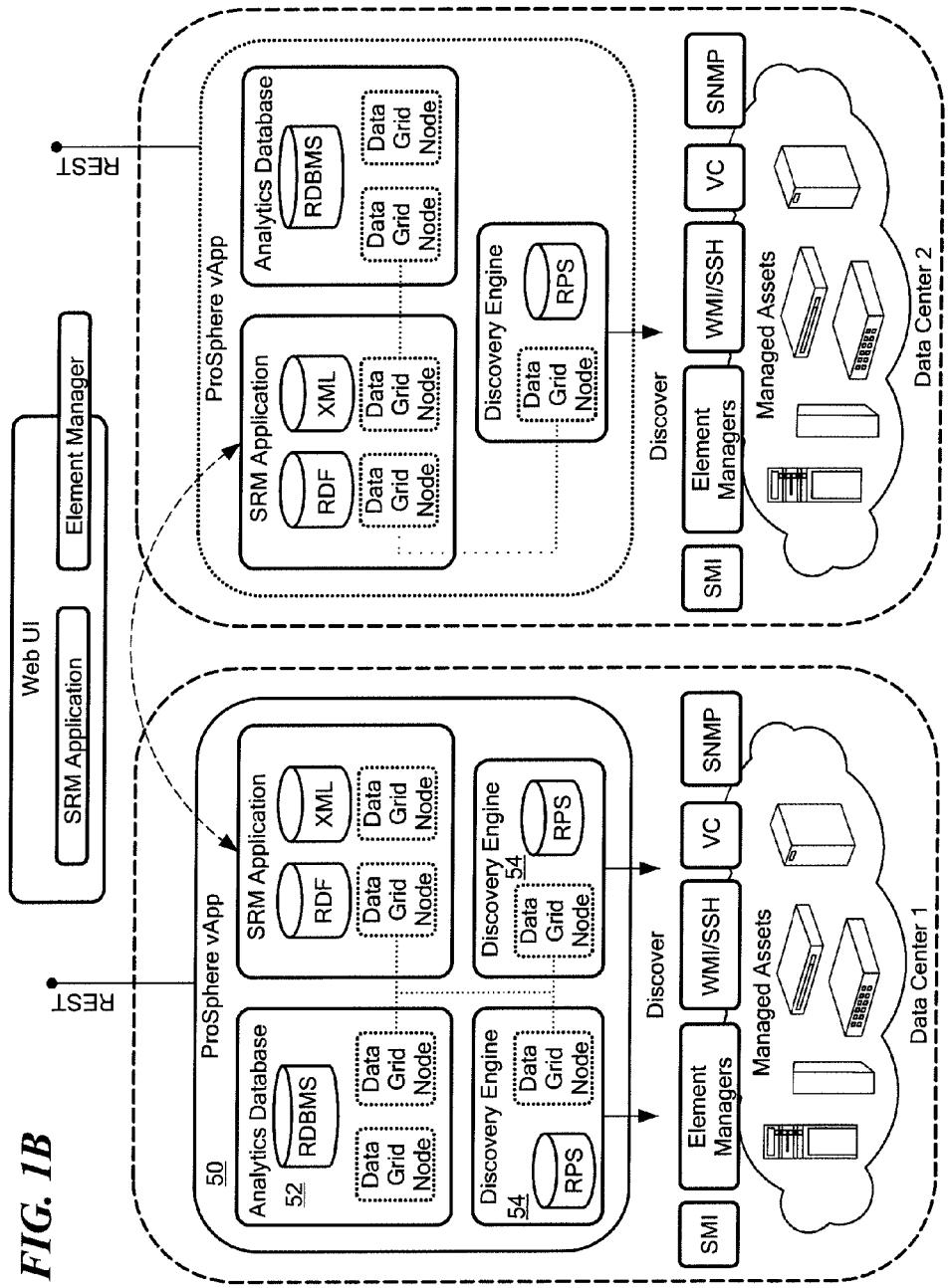
FIG. 1B is a block diagram of a virtual machine implementation of the SRM application of FIG. 1.

FIG. 1B shows an exemplary implementation with virtual machines for a virtual appliance 50, a database 52, and discovery engine(s) 54. Components and discovered information are contained in the VMs. The database 52 holds the historical performance data used to populate dashboards and performance charts. The discovery engine 54 hosts agentless technology used to discover a customer environment. The discovery appliances 54 leverage standards-based discovery mechanisms that are less intrusive than agent-based discovery systems. Agentless technology enables quicker time to value, as well as reducing the amount of time customers need to spend managing SRM.

Figure 2:
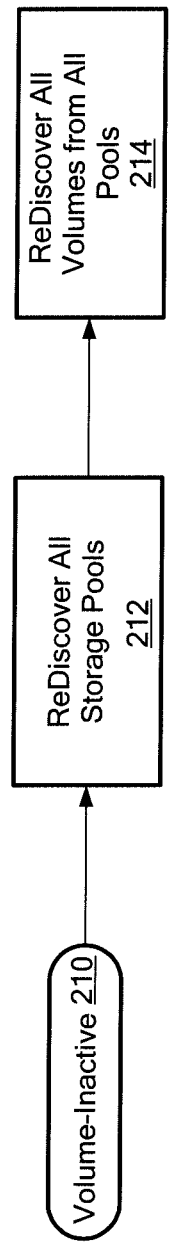
FIG. 2 is a flow diagram showing a prior art rediscovery of all storage pools for an inactive storage volume.

FIG. 2 shows a conventional discovery mechanism for an inactive volume. In the presence of an inactive volume 210, all storage pools must be rediscovered 212 by the system. After discovery of the storage pools, the volumes from the storage pools are rediscovered 214, including the inactive volume.

Figure 2A:
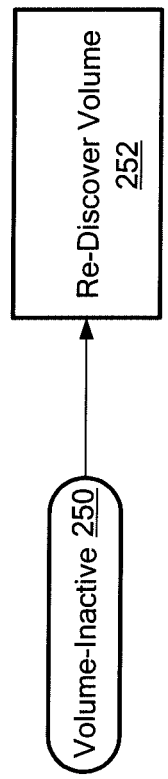
FIG. 2A is a flow diagram of rediscovery of an inactive storage volume in accordance with exemplary embodiments of the invention.

FIG. 2A shows an exemplary discovery approach in accordance with exemplary embodiments of the invention. In general, for an inactive volume 250, that particular volume is rediscovered 252 without rediscovering the storage pools, as described more fully below.

Figure 3:
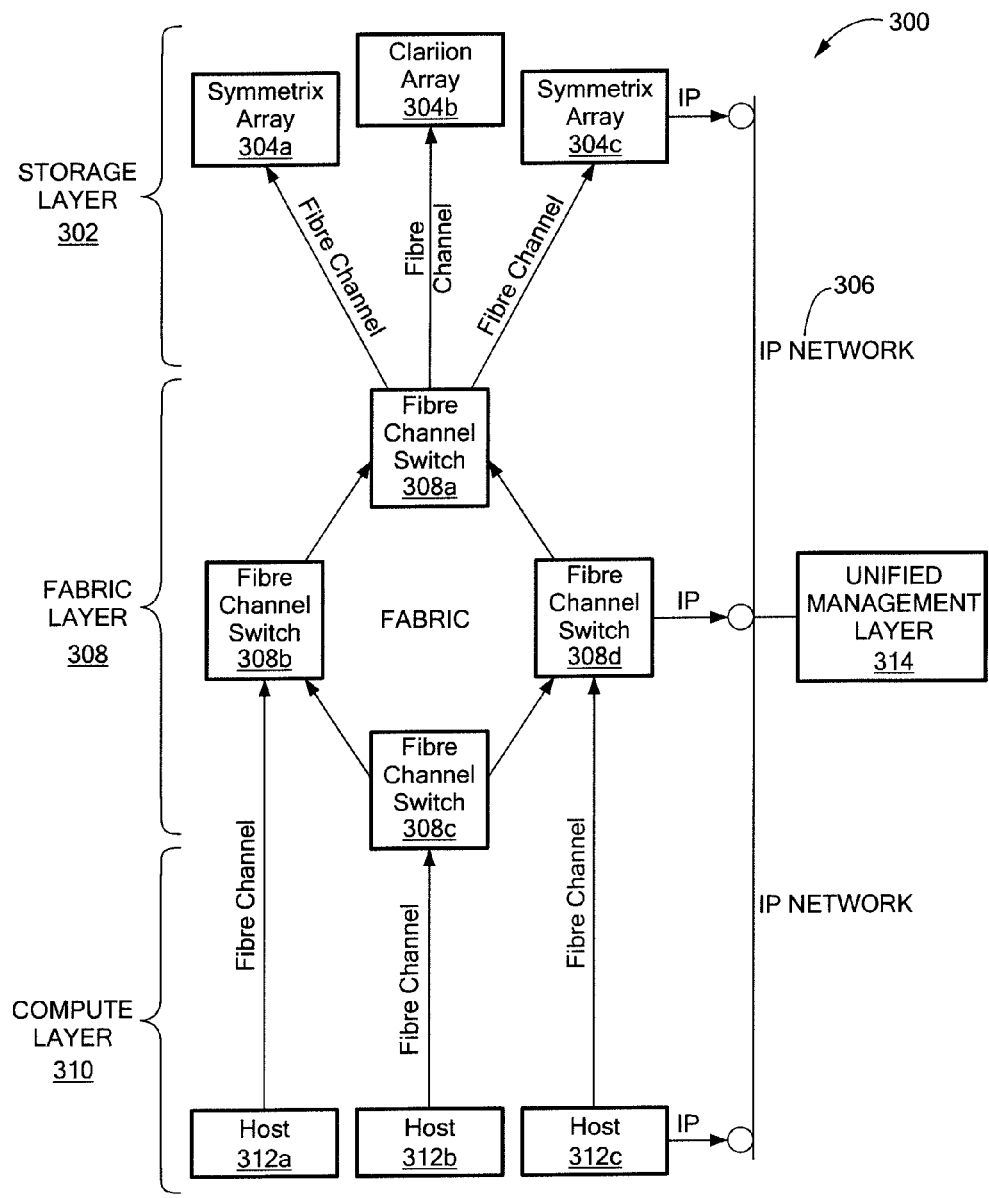
FIG. 3 is a schematic representation of a storage network having protocol independent ontology.

FIG. 3 shows an exemplary data center 300 having protocol independent discovery in accordance with exemplary embodiments of the invention. A storage layer 302 include a series of arrays 304*a-c* coupled to a network 306. A fabric or network layer 308 is coupled to the storage layer 302. The fabric layer 306 includes switches 308*a-d*, such as Fibre Channel switches. The fabric layer 308 is also coupled to the network 306. A compute layer 310 comprising a series of hosts 312*a-c* is coupled to the switches 308 and to the network 306. A management layer 314 is coupled to the storage, fabric, and computer layers via the network 306.

Figure 4:
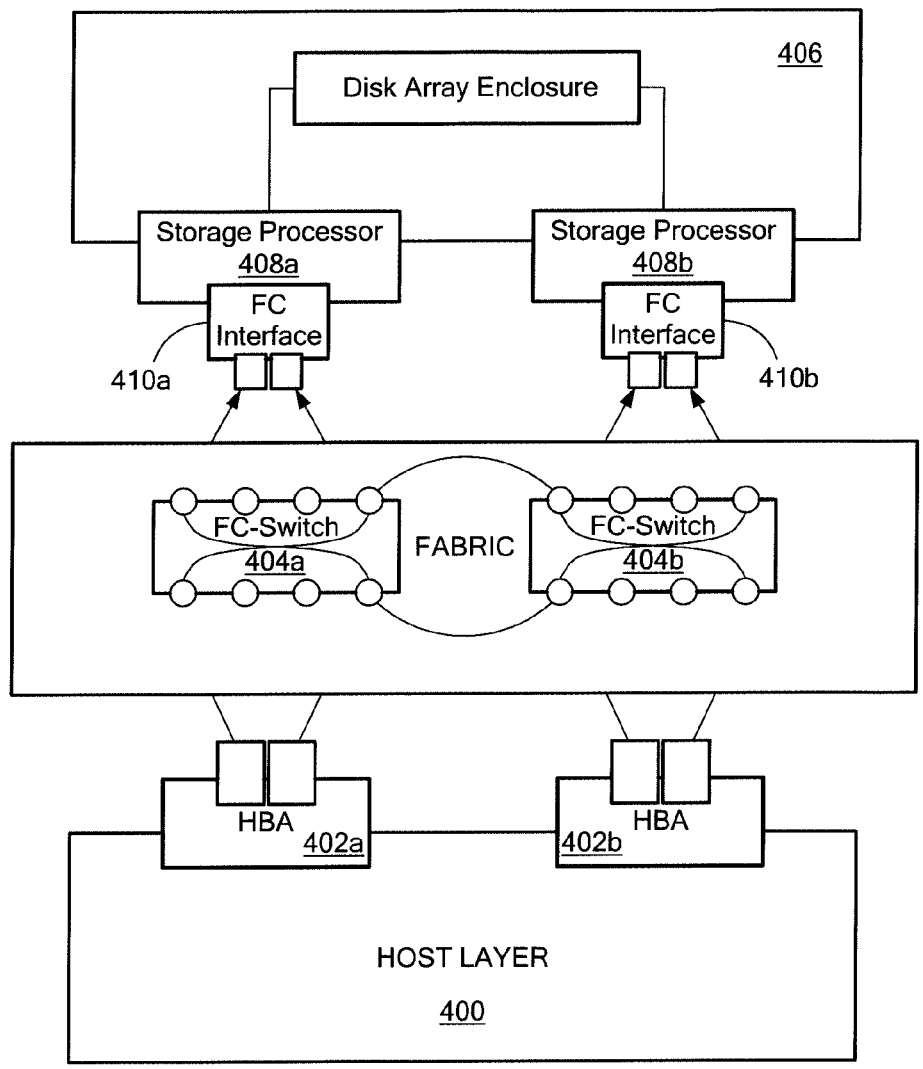
FIG. 4 is a schematic representation showing further detail for the storage network of FIG. 3.

The data center 300 has a number of objects that can be discovered, as shown in FIG. 4. A host layer 400 includes first and second host bus adapters 402*a,b* coupled to respective first and second FC switches 404*a,b* in the fabric layer. A disk array enclosure 406 includes first and second storage processors 408*a,b* having respective interfaces 410*a,b* coupled to the FC switches 404*a,b*.

It is understood that any practical number of arrays, switches, hosts and other components can be coupled in a variety of configuration to meet the needs of a particular application.

Figure 5:
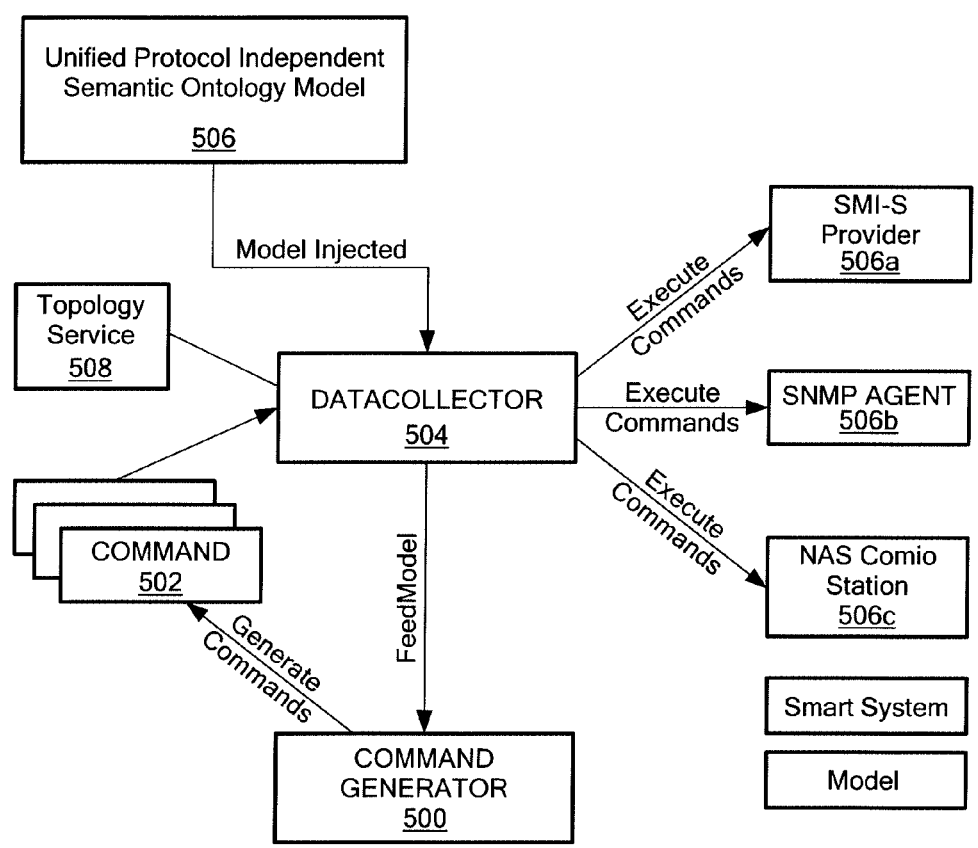
FIG. 5 is a functional block diagram of a storage network having protocol independent ontology.

FIG. 5 shows an exemplary block diagram to implement protocol independent unified ontology models for discovery and management. A command generator 500 generates commands 502 that are received by a data collector 504. An ontology model 506, which is described more fully below, provides information to the data collector 504. A topology service 508 provides topology information to the data collector 504. The data collector 504 executes commands in a protocol for the various components, shown as a SMI-S provider 506*a*, SNMP agent 506*b*, and NAS control station 506*c*.

The data collector 504 analyzes the model 506 and extracts operations from the model to generate the commands. The requested operations are executed based on input from the requestor and the model. The data collector 504 collects data from the providers and sends the information back to the requestor.

Figure 6:
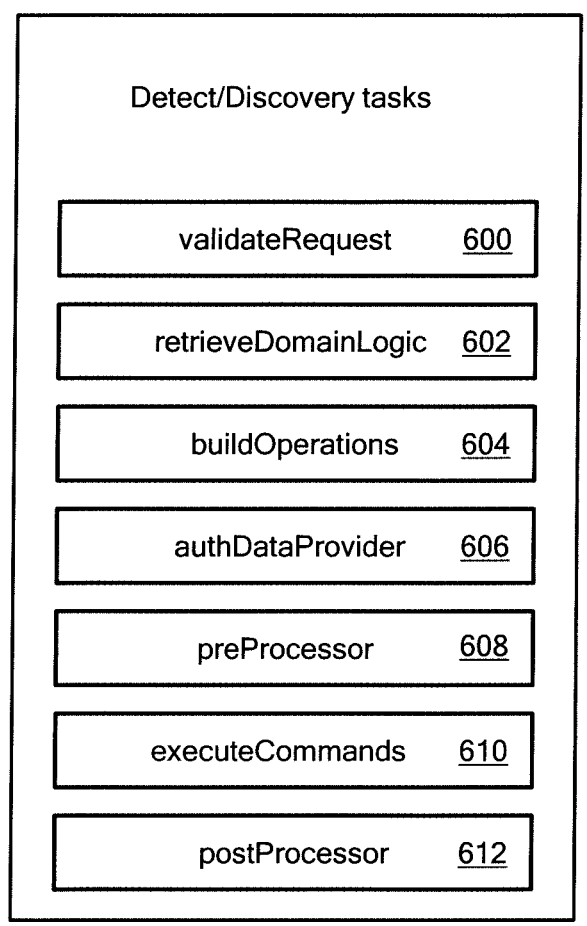
FIG. 6 is a high level flow diagram of protocol independent ontology.

FIG. 6 shows an exemplary high level sequence of steps for implementing protocol independent discovery. In step 600, a request is validated. In step 602, domain logic is retrieved. In step 604, an operation is built. In step 606, a data provider is authorized. In step 608, pre-processing is performed. In step 610, commands are executed. In step 612, post processing is performed.

Figure 7:
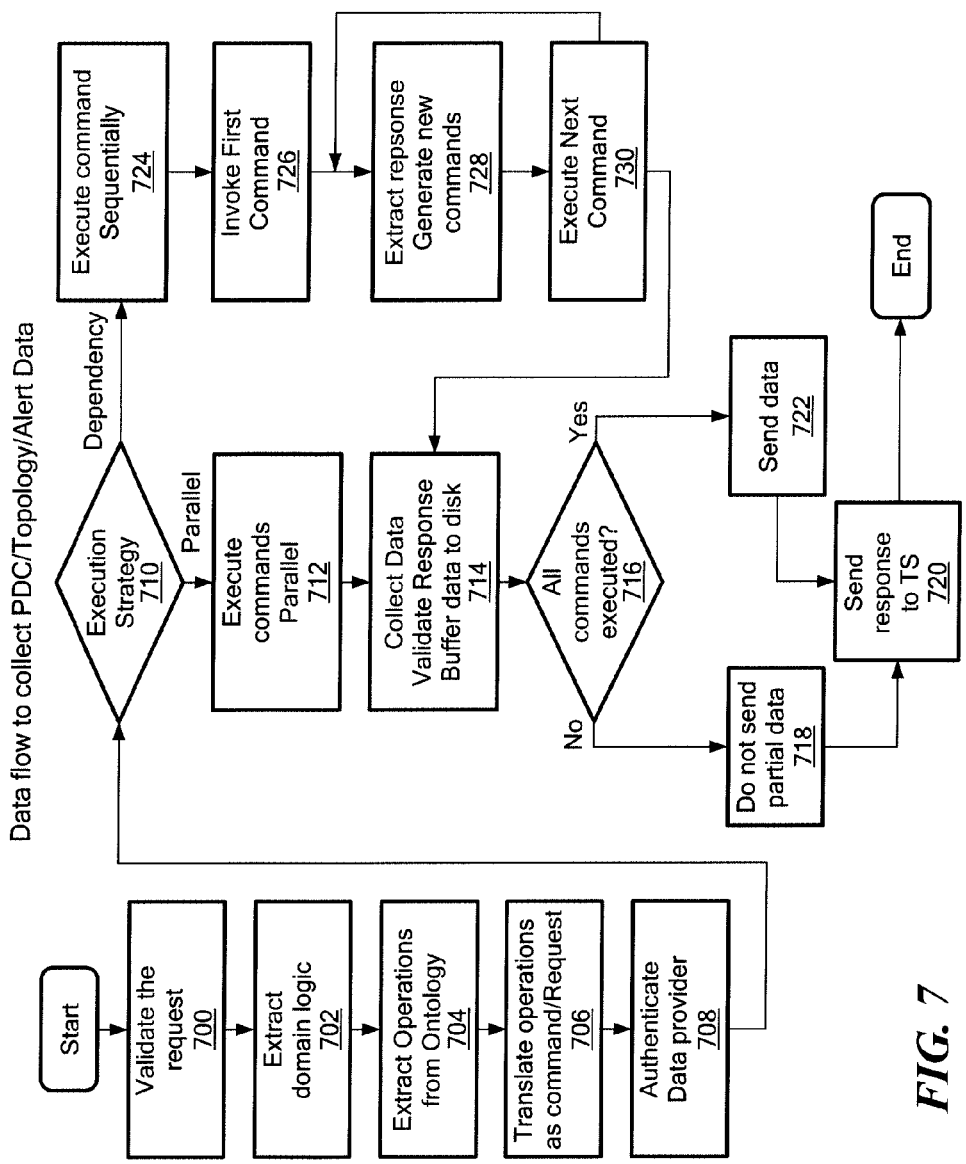
FIG. 7 is a flow diagram for a storage network having protocol independent ontology.

FIG. 7 shows further details of exemplary processing for protocol independent discovery. In step 700, the request is validated. In step 702, domain logic is extracted. In step 704, operations are extracted from the ontology of the request. In step 706, the operations are translated to a command/request. In step 708, the data provider is authenticated. In step 710, an execution strategy is determined. If the strategy is parallel execution, in step 712 commands are executed in parallel. In step 714, data is collected to validate the response. In one embodiment, data is buffered in disk. In step 716, is it determined whether all commands have been executed. If not, in step 718 partial data is not sent and in step 720 the response is sent to the topology service. If all commands have been executed, in step 722, the data is sent and the response is sent in step 720.

In the non-parallel, sequential path, in step 724 commands are executed sequentially. In step 726, the first command is invoked. In step 728, the response is extracted to generate new commands. In step 730, the next command is executed after which processing continues in step 714

Figure 8:
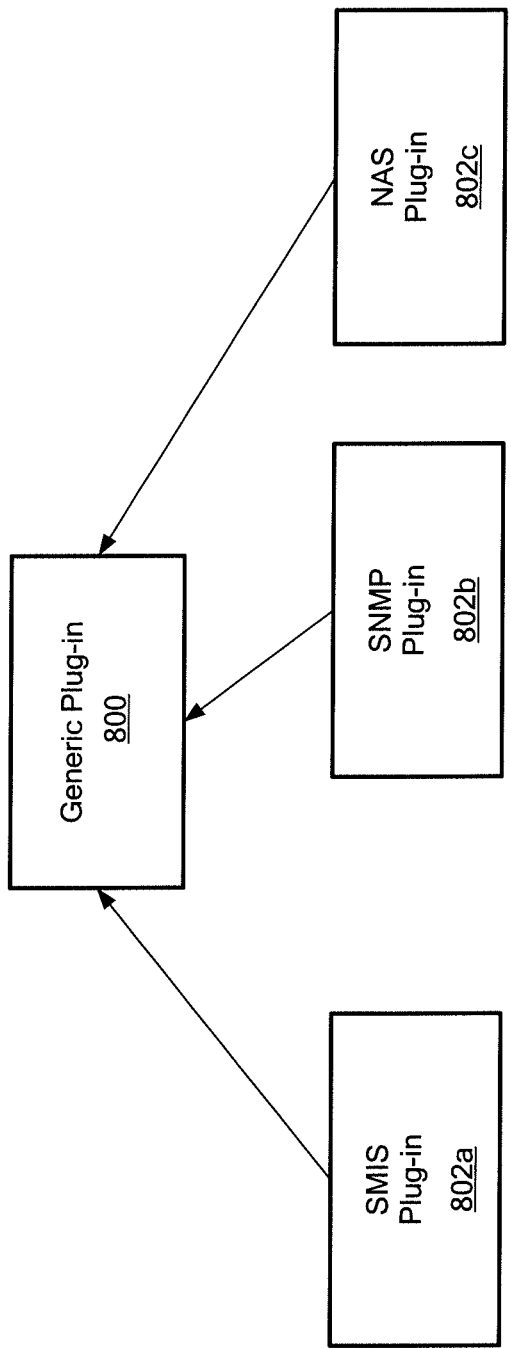
FIG. 8 is a schematic representation of plug-ins in a storage network having protocol independent ontology.

FIG. 8 shows a generic plug-in 800 coupled to exemplary plug-ins shown as a SMIS 2.0 plug-in 802a, a SPA plug-in 802b, and a NAS plug-in 802c. As noted above in FIG. 1A, plug-ins can be provided for SMI-S and SNMP communication protocols. Here, application (e.g., SPA for Symmetrix, NAS for Celerra) specific plug-ins are included in an illustrative embodiment.

This arrangement provides a number of advantages such as enabling the use of a custom domain logic parser and custom command generator. In one embodiment, the model domain logic is implemented in RDF with domain logic parsed from RDF. Commands are generated based on input parameters and collected data is sent only if all commands are executed successfully.

It is understood that an event can be considered as change in the existing environment (e.g., switch port goes offline, a disk failure cause a volume to inactive, etc.). In one embodiment, an indication DM 984 (FIG. 9) receives the event for notification to a discovery service, as described more fully below. Based on the event type (e.g., switch port offline), appropriate actions (discovery) can be invoked.

Exemplary RDF modeling for VOLUME-INACTIVE in FIG. 2 is set forth below:
VOLUME-INACTIVE Namespace RDF Instance
<!--ReDiscovery Algorithm for Volume InActive Event via SMI-S->
<rdf:Description rdf:about="#VOLUME-INACTIVE">
<rdfs:comment>ReDiscovery Algo for Volume InActive</rdfs:comment>
<rdfs:label>REDISCOVER VOLUME</rdfs:label>
<rdf:type rdf:resource="#Namespaces"/>
<srm:hasOperations rdf:resource="getVolumeInformation"/>
</rdf:Description>
Exemplary operations related to a VOLUME-INACTIVE event are set forth below:
<!--get Volume Information Instance-->
<rdf:Description rdf:about="#getVolumeInformation-Instance">
<rdfs:comment>Get Instance Call used in SMI to get Volume Information</rdfs:comment>
<rdf:type rdf:resource="#getVolumeInformation"/>
<srm:hasInputArgs rdf:resource="#Volume-CIMObjectPath"/>
<srm:hasInputArgs rdf:literal="true"/>
<srm:hasInputArgs rdf:literal="false"/>
<!--Method Name used to execute this operation-->
<srm:hasInputArgs rdf:literal="getInstance"/>
<!--Protocol used here is SMI-S-->
<srm:hasInputArguments rdf:resource="#SMIS-WBEM-Client"/>
</rdf:Description>

Referring to FIG. 5 in conjunction with the above, it can be seen that the Operation-Argument model comprises a unified model that can address a wide variety of device/protocol discovery use cases. The operation has set of attributes including:
name—name of the operation
method—name of the method to execute
instance—the underlying library on which the method needs to get executed. Instance can be a reference of http client, or any other third party libraries
set of arguments—the input passed to data provider
Data collector 504 responsibilities include analyzing the model 506 and extracting operations from the model. With the model information, the command generator 500 generates commands for operations that are executed based on the input. Data from the provider 506 is collected and sent back to the requester 502.

As will be appreciated, in conventional systems, when a volume goes offline, all storage pools have to be discovered first and then all volumes have to rediscovered.

Below model is an example of Discovery of Volume on receiving a VOLUME-INACTIVE event. Here, VOLUME-INACTIVE is being modeled as a namespace. "getVolumeInformation" is the corresponding method which lies under namespace and includes necessary input Arguments, and the reference on which the method needs to get executed.
<!--Namespaces refers to top level Actions like EVENT-BASED-REDISCOVERY, DISCOVERY etc-->
<rdfs:Class rdf:about="#Namespaces"/>
<rdfs:comment xml:lang="en">
Refers to Event Based Discovery of Arrays,Hosts,Switches.
</rdfs:comment>
<rdfs:label xml:lang="en">Namespaces</rdfs:label>
<owl:equivalentClass>
<owl:Restriction>
<owl:onProperty rdf:resource="#hasOperations"/>
<owl:allValuesFrom rdf:resource="#Operations"/>
</owl:Restriction>
</owl:equivalentClass>
<!--Namespaces can exists without having operations-->
<rdfs:subClassOf>
<owl:Restriction>
<owl:onProperty rdf:resource="hasOperations"/>
<owl:minCardinality rdf:datatype="xsd:notNegativeinteger">0</owl:minCardinality>
</owl:Restriction>
</rdfs:subClassOf>
</rdfs:Class>
Operations:
<rdfs:Class rdf:about="#Operations">
<owl:equivalentClass>
<owl:Restriction>
<owl:onProperty rdf:resource="#hasInputArgs"/>
</owl:Restriction>
</owl:equivalentClass>
<!--Any instance whose hasInputArgs having the value (for all) "InputArguments" is an instance of Operations, hence equivalent Class-->
<owl:equivalentClass>
<owl:Restriction>
<owl:onProperty rdf:resource="#hasInputArgs"/>

```
    <owl:allValuesFrom rdf:
        resource="#InputArguments"/>
</owl:Restriction>
</owl: equivalentClass>
<!--Only WSMAN contains Operations nested under
operations, hence minCardinality as 0-->
<owl:equivalentClass>
<owl:Restriction>
    <owl:onProperty rdf:
        resource="#hasInputOperations"/>
</owl:Restriction>
</owl:equivalentClass>
<rdfs:comment>List of SMI-S operations</rdfs:comment>
<rdfs:label>Operations</rdfs:label>
</rdfs:Class>
<!--Object Property-->
<owl:ObjectProperty rdf:about="#hasOperations">
<rdfs:comment>Various Operations SMI-S or SNMP or
    any api calls involved in Event Re-Discovery </rdfs:
    comment>
<rdfs:label>Operation List</rdfs:label/>
<rdfs:domain rdf:resource="#Namespaces"/>
<rdfs:range rdf:resource="#Operations"/>
</owl:ObjectProperty>
VOLUME-INACTIVE Namespace RDF Instance
<!--ReDiscovery Algorithm for Volume InActive Event
via SMI-S-->
<rdf:Description rdf:about="#VOLUME-INACTIVE">
<rdfs:comment>ReDiscovery Algo for Volume
InActive</rdfs:comment>
<rdfs:label>REDISCOVER VOLUME</rdfs:label>
<rdf:type rdf:resource="#Namespaces"/>
    <srm:hasOperations rdf:
        resource="getVolumeInformation"/>
</rdf:Description>
<!--Modeling SMI Operation getVolumeInformation-->
<rdfs:Class rdf:about="#getVolumeInformation">
<rdfs:comment>SMI-S Operation-getVolumeInforma-
    tion</rdfs:comment>
<rdfs:subClassOf rdf:resource="#Operations"/>
</rdfs:Class>
<!--get Volume Information Instance-->
<rdf:Description rdf:about="#getVolumeInformation-In-
stance">
<rdfs:comment>Get Instance Call used in SMI to get
    Volume Information</rdfs:comment>
<rdf:type rdf:resource="#getVolumeInformation"/>
<srm:hasInputArgs rdf:resource="#Volume-CIMObject-
    Path"/>
<srm:hasInputArqs rdf:literal="true"/>
<srm:hasInputArgs rdf:literal="false"/>
<!--Method Name used to execute this operation-->
<srm:hasInputArgs rdf:literal="getInstance"/>
<!--Protocol used here is SMI-S-->
<srm:hasInputArguments rdf:resource="#SMIS-WBEM-
    Client"/>
</rdf:Description>
Modeling Arguments:
<rdfs:Class rdf:about="#InputArguments">
<!--Any instance of Argument should have a name prop-
    erty-->
<rdfs:subClassOf>
    <owl:Restriction>
        <owl:onProperty rdf:resource="#Name"/>
        <owl:maxCardinality rdf:datatype="xsd:nonNega-
            tiveInteger">1</owl:maxCardinality>
```

```
</owl:Restriction>
</rdfs:subClassOf>
!--Any instance of Argument should have a value prop-
    erty, and any instance having a property "hasargValues"
    is an instance of InputArgument-->
<owl:equivalentClass>
    <owl:Restriction>
        <owl:onProperty rdf:resource="#hasargValues"/>
        <owl:maxCardinality rdf:datatype="xsd:nonNega-
            tiveInteger">1</owl:maxCardinality>
    </owl:Restriction>
</owl:equivalentClass>
</rdfs:Class>
<rdfs:Class rdf:about="#CIMObjectPath">
<rdfs:subClassOf rdf:resource="#InputArguments"/>
<rdfs:comment xml:lang="en">Input Arguments used in
    SMIS Call</rdfs:comment>
<rdfs:label xml:lang="en">SMI-S Argument</rdfs:la-
    bel>
</rdfs:Class>
<rdf:Description rdf:about="#Volume-CIMObjectPath">
<rdf:type rdf:resource="#CIMObjectPath"/>
<srm:method rdf:literal="getCIMObjectPath"/>
<!--Value will be used as key at runtime to store Volume
CIMObjectPath-->
<srm:hasInputArguments rdf:literal="Volume"/>
<rdf:Description>
<!--SMI-S being modeled-->
<rdf:Description rdf:about="#SMIS-WBEM-Client">
<srm:method ref:literal="getWBEMClient"/>
</rdf:Description>
    For an event-based discovery model, discovery of a
switch for example, can be split into multiple phases:
    1. SWITCHDISCOVERY
    2. SWITCHPORT DISCOVERY
    3. FABRICDISCOVERY
    4. ZONESET DISCOVERY
    Each phase is modeled as a namespace below. Say, in a
Brocade SWITCHPORT DISCOVERY phase, listed the
below sequence of Steps performed.
    1. Brocade Switch Discovery is done via SMI-S Stan-
        dards.
    2. The first step is to get a handle to the SMI-S Provider.
        (WBEMClient Handle)
    3. Execute a sequence of SMI-S standard extrinsic meth-
        ods above the handle to get the desired output.
    This model focuses on modeling the entire sequence of
SMI-S extrinsic calls for specific namespace, i.e., each
SMI-S call to a provider is treated as an operation.
    Each Namespace includes multiple Operations. Each
Operation includes:
    1. Client name to be invoked
    2. Method Name to be executed
    3. Input Arguments for the above method
    An exemplary ontology-based model for FC switch dis-
covery, such as the FC switch 404 of FIG. 4, is set forth
below. This .owl specifies the list of classes and relations
needed for completing a namespace discovery. In the illus-
trative embodiment, the model supports SMI-S
    <!--Instance-->
    <rdf:Description rdf:about="http://ontologies.emc.com/
srm/baSe/2011/10/srm-smi-domainlogic#BROCADE-
SWITCH-SMI">
    <rdfs:comment xml:lang="en">Namespace used in dis-
        covering a Brocade Switch</rdfs:comment>
    <rdfs:label xml:lang="en">Discover Brocade Switch</
        rdfs:label>
```

```
<srmbase:Name xml:lang="en">BROCADE-SWITCH-
   SMI</srmbase:Name>
<rdf:type rdf:resource="http://ontologies.emc.com/srm/
   base/2011/10/srm-smi-domainlogic#Namespaces"/>
<srm-smi-domainlogic:hasOperations
   rdf:resource="http://ontologies.emc.com/srm/base/2011/
10/srm-smi-domainlogic#getSwitchInfo"/>
</rdf:Description>
<rdf:Description rdf:about="http://ontologies.emc.com/
srm/base/2011/10/srm-smi-domainlogic#getInstance-1">
   <rdfs:comment xml:lang="en">Get Switch Info</rdfs:
      comment>
   <rdfs:label xml:lang="en">getSwitchInfo</rdfs:label>
   <srmbase:Name>getSwitchInformation</srmbase:
      Name>
   <rdf:type rdf:resource="http://ontologies.emc.com/srm/
      base/2011/10/srm-smi-domainlogic#Operation"/>
   <srm-smi-domainlogic:hasInputArgs
      rdf:resource="http://ontologies.emc.com/srm/base/2011/
10/srm-smi-domainlogic#switchID"/>
   <srm-smi-domainlogic:hasInputArgs
      rdf:resource="http://ontologies.emc.com/srm/base/2011/
10/srm-smi-domainlogic##ProviderDetails"/>
</rdf:Description>
```

Figure 9:
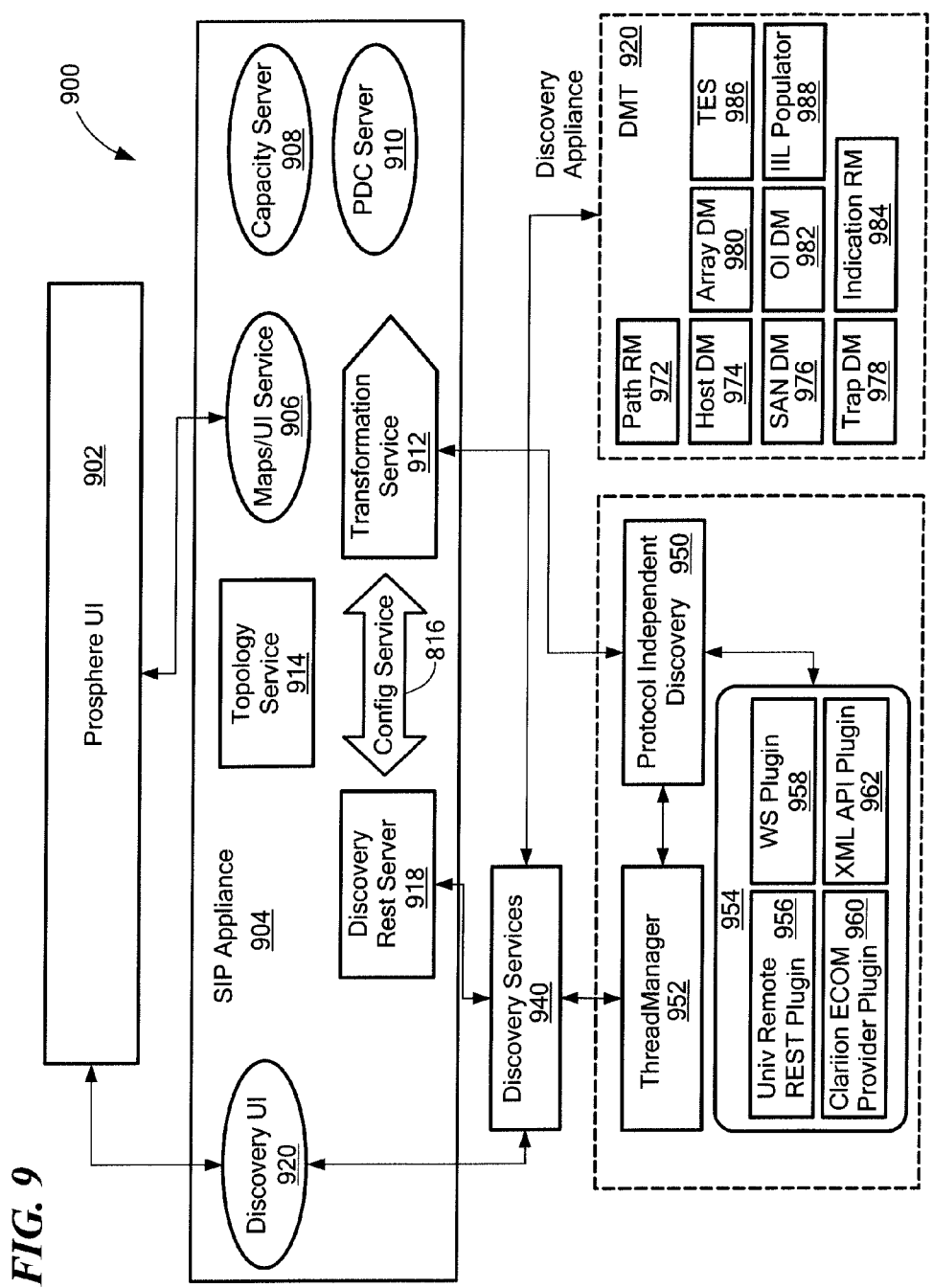
FIG. 9 is a block diagram showing components in a storage network having protocol independent ontology.

FIG. 9 shows an exemplary system 900 in block diagram form to provide a protocol independent model for event-based discovery. A user interface 902, such as the EMC PROSPHERE UI, enables a user to interact with the system. In an exemplary embodiment, a SRM appliance 904 is coupled to the user interface 902. A map/UI service 906 is coupled to the user interface 902. The SRM appliance 904 further includes a capacity server 908 and a PDC (performance data collector) server 910. A transformation service 912 interacts with protocol independent discovery 950, as described more fully below. A topology service 914 provides topology services, as described above. A discovery service 916 interacts with the transformation service 912 and a discovery rest server 918. A discovery user interface 920 enables interaction between the user interface 902 and discovery services 940, as described more fully below.

A discovery appliance 970 is coupled to the discovery services 940. In one embodiment, the discovery appliance 970 includes a path DM 972, host DM 974, a SAN DM 976, a trap DM 978, an array DM 980, an OI DM 982, an indication DM 984, a TES (topology edit service) 986 and TS (topology service) populator 988.

A thread manager 952 is coupled between the discovery services 940 and the protocol independent discovery module 950. A plug in repository 954 is coupled to the protocol independent discovery module 950. In the illustrative embodiment, the plug ins include a universal remote REST plug in 956, a WS plug in 958, an CLARiiON ECOM Provider plug in 960, and a Celerra XML API plug in 962. It is understood that a variety of other plug ins can also be included.

Figure 10:
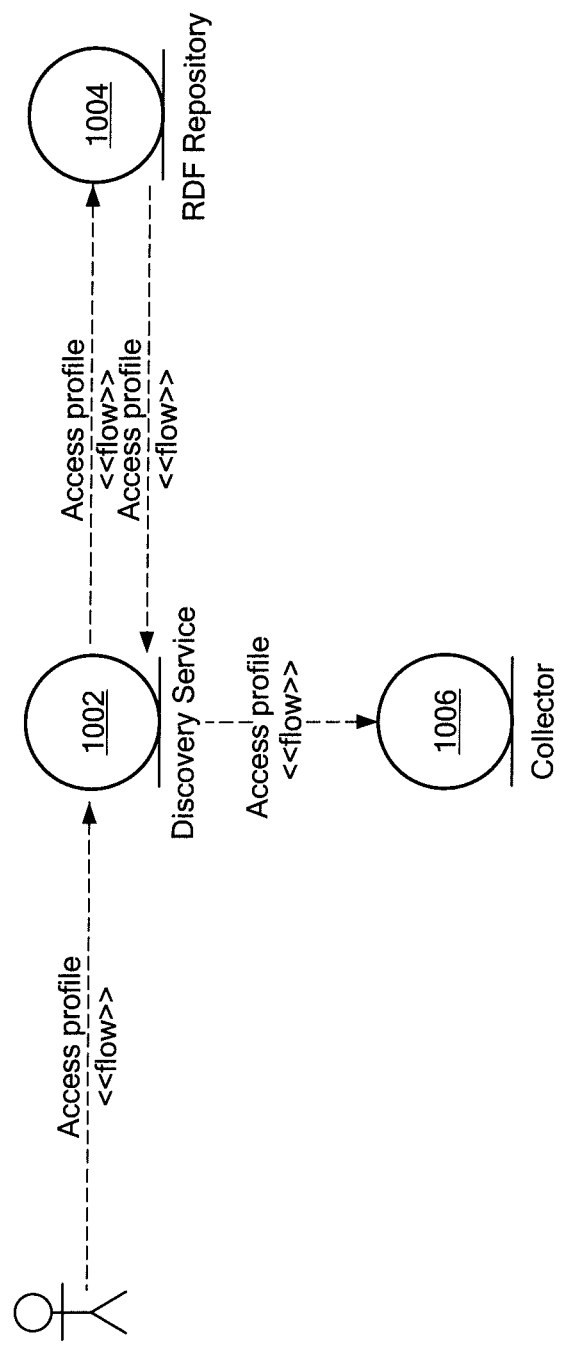
FIG. 10 is a flow diagram showing interaction between elements in a storage network having protocol independent ontology.

FIG. 10 shows an exemplary flow for a user 1000 to interact with discovery services 1002, such as the discovery services 940 of FIG. 9. The discovery services 1002 has to and from access profiles with a resource data framework (RDF) repository 1004. The discovery services 1002 has an access profile flow to a collector 1006, such as the collector 504 of FIG. 5. In an exemplary embodiment, an access profile includes protocol, element type, and credentials (e.g., user name, password)

Figure 11:
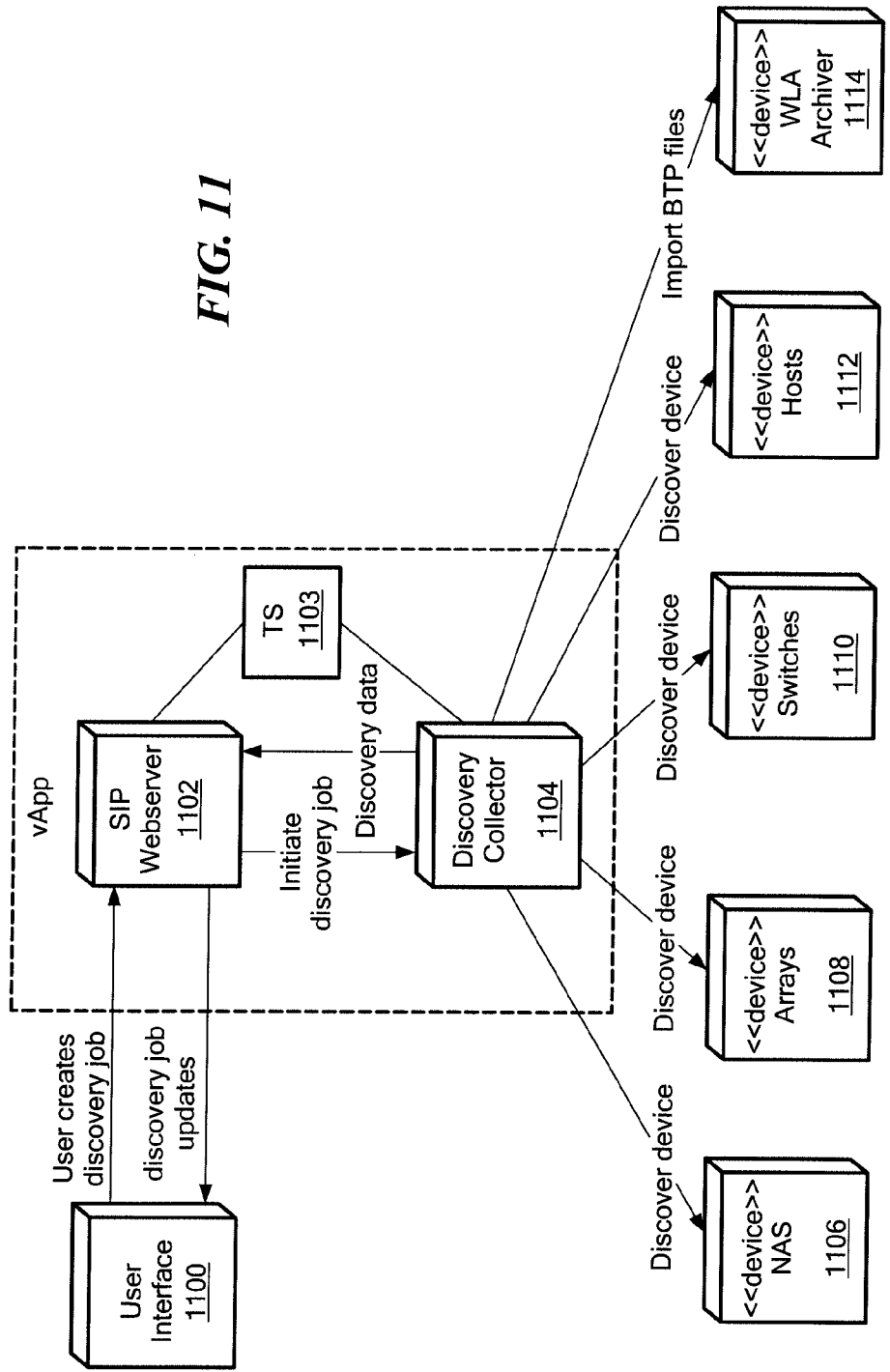
FIG. 11 is a context diagram for a storage network having protocol independent ontology.

FIG. 11 shows an exemplary context diagram 1100 for protocol independence. A user interface 1100 interacts with a webserver 1102 to create a discovery job and receive discovery job updates. The webserver 1102 initiates a discovery job with a discovery collector 1104. The discovery collector 1104 has discover device capability for devices in the system. Illustrative devices include a NAS device 1106, arrays 1108, switches 1110, hosts 112, and archivers 1114. The data collected from various devices are then sent to topology service 1103 for further processing and persistence.

Figure 12:
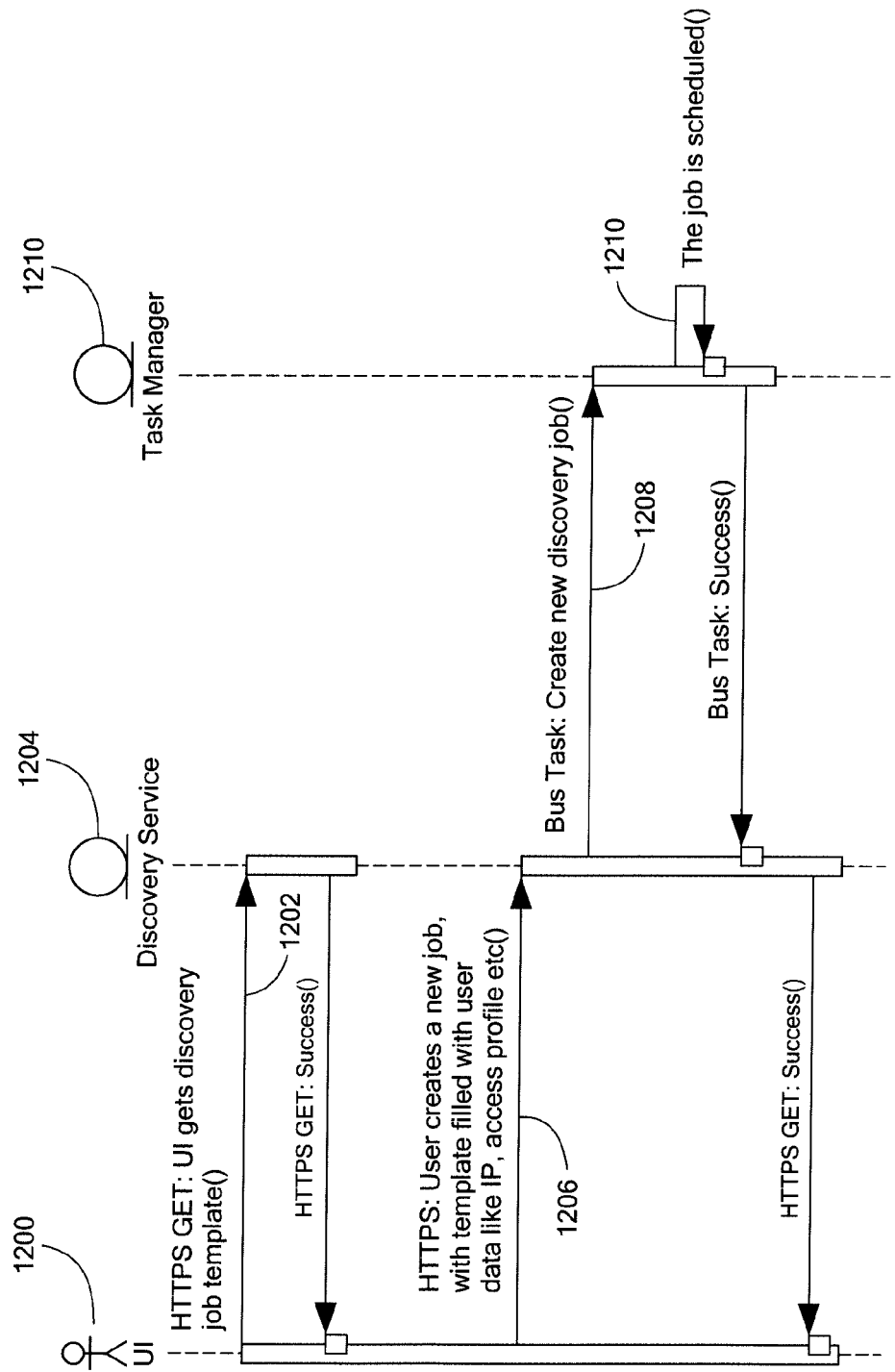
FIG. 12 is a sequence diagram for a discovery job in a storage network having protocol independent ontology.

FIG. 12 shows an exemplary flow for a new discovery job. A user 1200 interacts with a user interface, such as the user interface 1100 of FIG. 11, that can provide a template 1202, e.g., display screen, into which a user can enter information for use by a discovery service 1204, such as the discovery service 940 of FIG. 9. The user fills the template 1206 with data, such as IP, access profile, etc., for use by the discovery service 1204. A new job is created by the discovery service 1204 that is handled by a task manager 1210, which schedules the job 1210. A successful job event or notification is provided to the discovery service 1204 and user interface 1200. A user can update a job in a similar manner.

Figure 13:
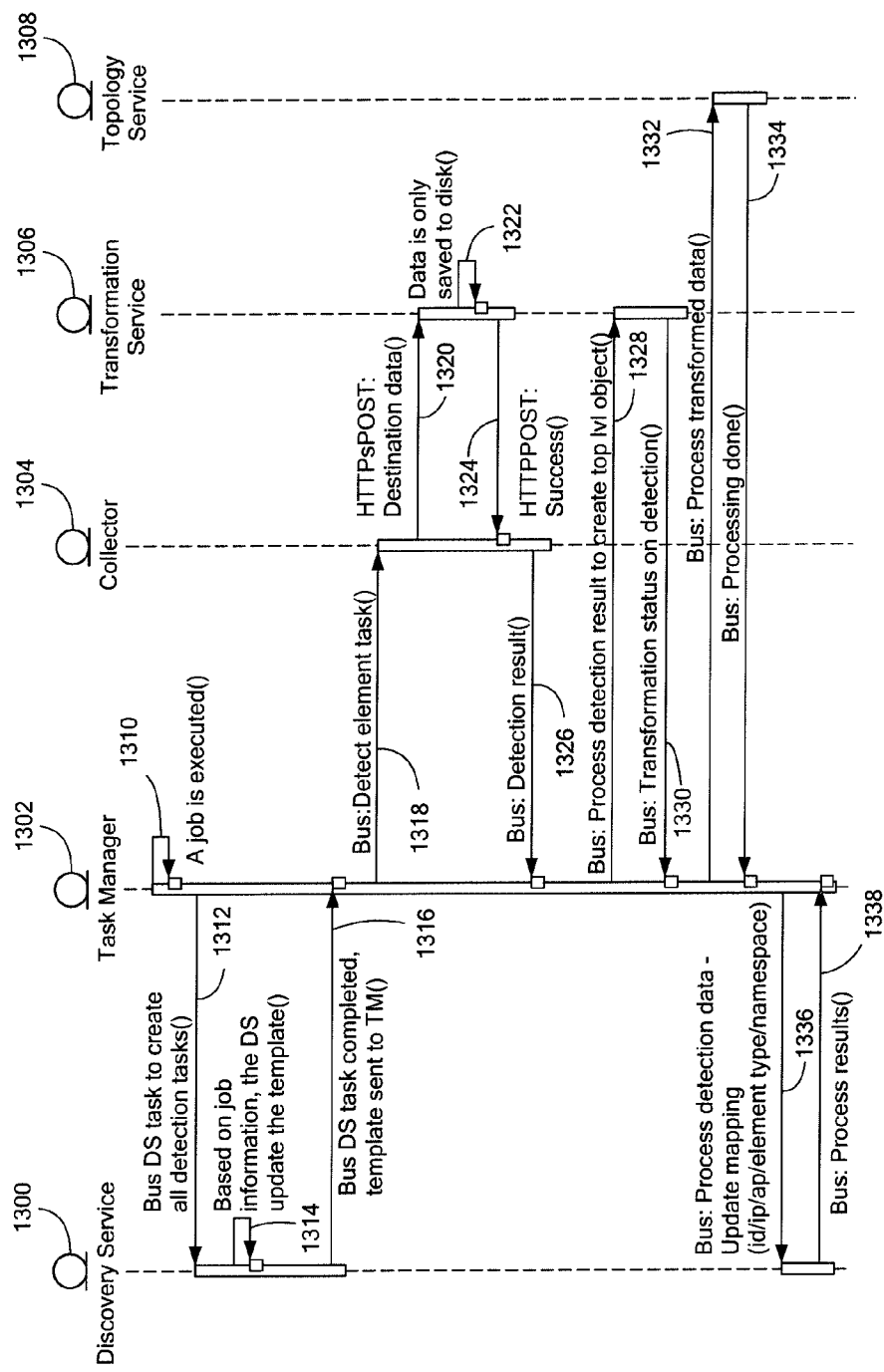
FIG. 13 is a sequence diagram for detection in a storage network having protocol independent ontology.

FIG. 13 shows an exemplary sequence diagram for detection that shows interaction among a discovery service 1300, a task manager 1302, a collector 1304, a transformation service 1306, and an topology service 1308. The task manager 1302 executes a job 1310 and a discovery service task to create detection tasks is created 1312. The discovery service update a user template with detection information based on the job information 1314. When the task completes, the template is sent to the task manager 1316, which detects an element task 1318. The collector 1304 collects detection data 1320 for the transformation service, which may save data to disk. Results 1324, 1326 are passed to the collector 1304 and task manager 1302. The task manager 1302 then processes the detection results 1328 and the transformation service 1306 sends transformation data 1330 to the task manager, which sends processed transformation data 1332 to the topology service 1308. The topology service sends a success notification 1334 to the task manager, which sends processed detection data and updated mapping 1336 to the discovery service 1300. The result is sent 1338 to the task manager.

Figure 14:
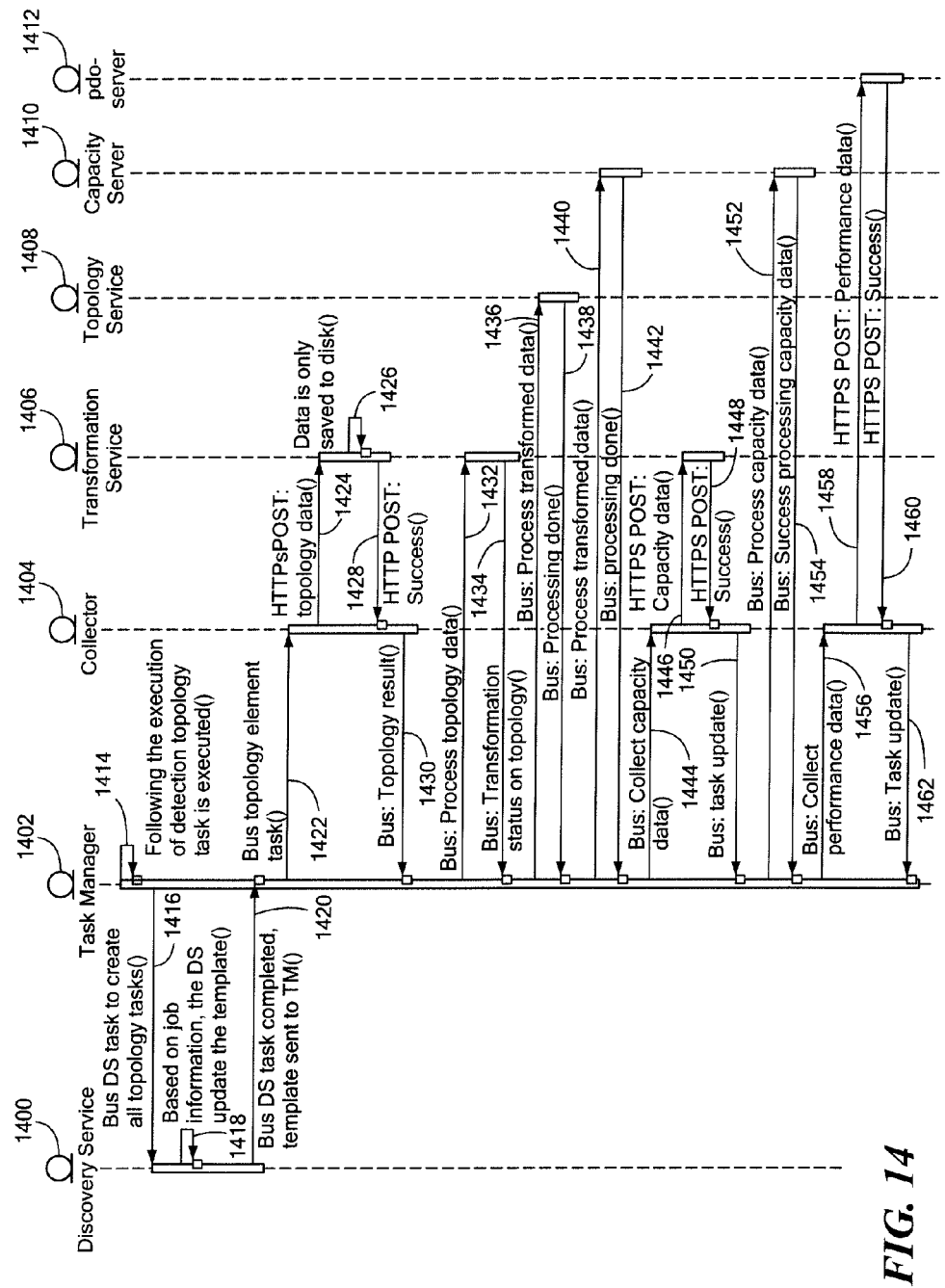
FIG. 14 is a sequence diagram for a topology task in a storage network having protocol independent ontology.

FIG. 14 shows a sequence diagram for topology updates that shows interaction among a discovery service 1400, a task manager 1402, a collector 1404, a transformation service 1406, an topology service 1408, a capacity server 1410, and a performance data collector 1412. After detection, a topology task is executed 1414 and a discovery service task is created for topology tasks 1416. Based on job information, the discovery service updates a user template 1418. Once the task completes, the template is sent 1420 to task manager, which generates a topology element task 1422. The collector collects topology data 1424 and data is saved to disk 1426. Results 1428, 1430 are sent to the collector and the task manager.

It is understood that a variety of topology tasks can be created. For example, for an array toplogy task, the following are discovered.

Front and back end ports;
Storage processors, Pools;
Array software version;
Volumes; and
Masking and Mapping Information
A switch topology task can discover the following:
Switch ports;
Switch Software Version;
Fabric Discovery; and
ZONESET and ZONES discovery.

The task manager processes the topology data 1432 for the transformation service which provides transformation status 1434 to the task manager. The transformation data is processed 1436 for the topology service which sends a processing done notification 1438 to the task manager. The processed data is sent 1440 to the capacity server which sends a done notification 1442 to the task manager. Capacity data is then collected 1444 and sent 1446 to the transformation service, which generates a success notification 1448 after which the task is updated 1450. The capacity data is processed 1452 after which a success notification 1454 is sent to the task manager. Performance data is then collected 1456 and sent 1458 to the performance data collection server 1412. A success notification 1460 is sent to the collector and the task is updated 1462.

Figure 15:
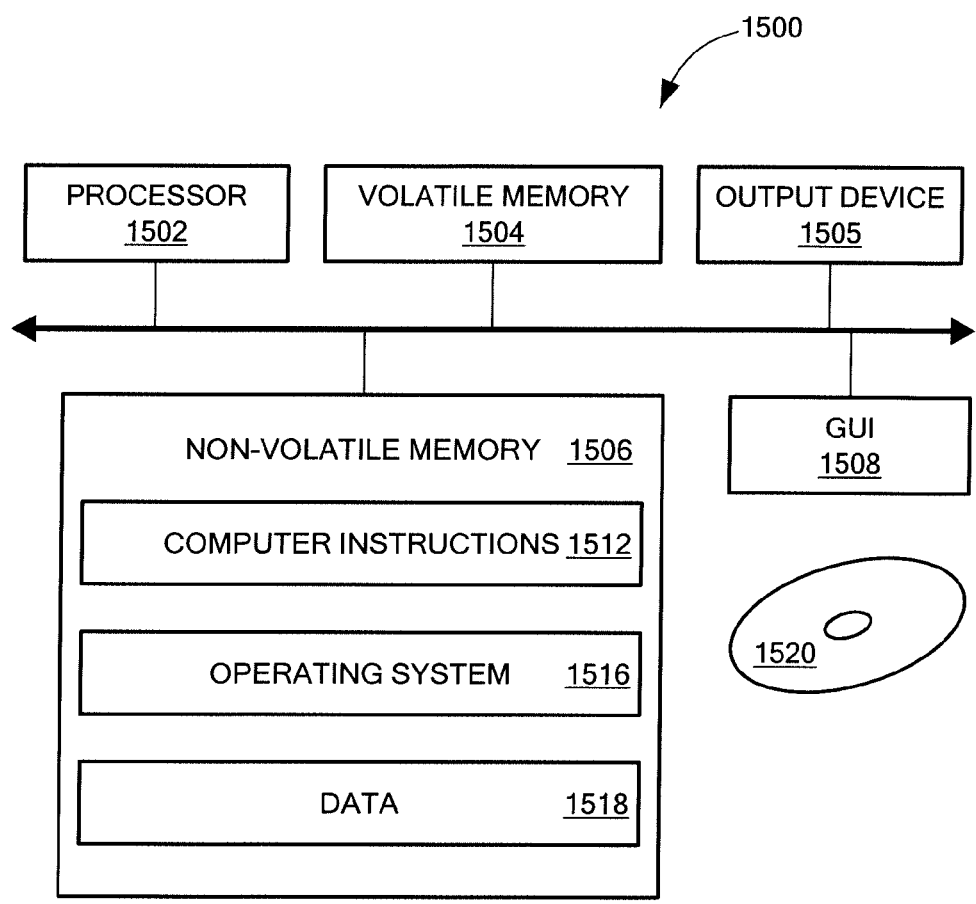
FIG. 15 is a schematic representation of an exemplary computer that can perform at least a portion of the processing described herein.

FIG. 15 shows an exemplary computer 1500 that can perform at least part of the processing described herein. The computer 1500 includes a processor 1502, a volatile memory 1504, a non-volatile memory 1506 (e.g., hard disk), and a graphical user interface (GUI) 1508 (e.g., a mouse, a keyboard, a display, for example). The non-volatile memory 1506 stores computer instructions 1512, an operating system 1516 and data 1518. In one example, the computer instructions 1512 are executed by the processor 1502 out of volatile memory 1504. In one embodiment, an article 1520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
   receiving an event including information provided by a user, wherein the event corresponds to an active volume in a storage layer of a system changing to an inactive volume;
   creating a discovery job in response to the event using the information provided by the user;
   initiating the discovery job with a discovery collector; and
   performing rediscovery of a device based upon the event and the information provided by the user using a protocol independent ontology model, wherein the device comprises a first one of an array in a storage layer, a switch in a network layer, a host in a compute layer, or a NAS device, wherein the array, switch, and host are accessed by different protocols,
   wherein the device comprises the inactive volume in the storage layer and the rediscovery of the inactive volume is performed based on the event without rediscovering other volumes in a storage pool containing the inactive volume, and
   wherein the event is modeled as a namespace in a resource data framework (RDF), and wherein the namespace refers to rediscovery of the inactive volume.

2. The method according to claim 1, wherein discovery of the switch as the device comprises phases of switch discovery, fabric discovery, and zone discovery.

3. The method according to claim 2, further including modeling the phase as namespace.

4. The method according to claim 3, wherein the namespace includes operations of name to invoke, method name to execute, and input arguments for the method.

5. The method according to claim 4, further including using a resource data framework (RDF).

6. The method according to claim 1, further including performing a topology task.

7. The method according to claim 6, wherein the topology task is for an array for which discovery occurs for: ports, storage processors, pools, volumes, and masking and mapping information.

8. The method according to claim 6, wherein the topology task is for a switch for which discovery occurs for: ports, fabric discovery, and zones.

9. The method according to claim 1, further including collecting performance data in response to the event.

10. An article, comprising:
    a computer-readable medium containing non-transitory stored instructions that enable a machine to perform:
    receiving an event including information provided by a user, wherein the event corresponds to an active volume in a storage layer of a system changing to an inactive volume;
    creating a discovery job in response to the event using the information provided by the user;
    initiating the discovery job with a discovery collector; and
    performing rediscovery of a device based upon the event and the information provided by the user using a protocol independent ontology model, wherein the device comprises a first one of an array in a storage layer, a switch in a network layer, a host in a compute layer, or a NAS device, wherein the array, switch, and host are accessed by different protocols, wherein the device comprises the inactive volume in the storage layer and the rediscovery of the inactive volume is performed based on the event without rediscovering other volumes in a storage pool containing the inactive volume, and wherein the event is modeled as a namespace in a resource data framework (RDF), and wherein the namespace refers to rediscovery of the inactive volume.

11. The article according to claim 10, wherein discovery of the switch as the device comprises phases of switch discovery, fabric discovery, and zone discovery.

12. The article according to claim 11, further including instructions for modeling the phase as namespace.

13. The article according to claim 12, wherein the namespace includes operations of name to invoke, method name to execute, and input arguments for the method.

14. The article according to claim 13, further including instructions for using a resource data framework (RDF).

15. The article according to claim 10, further including instructions for performing a topology task.

16. The article according to claim 15, wherein the topology task is for an array for which discovery occurs for: ports, storage processors, pools, volumes, and masking and mapping information.

17. The article according to claim 15, wherein the topology task is for a switch for which discovery occurs for: ports, fabric discovery, and zones.

18. A system, comprising:
at least one processor; and
at least one memory coupled to the at least one processor, the at least one processor and the at least one memory configured to:
receive an event including information provided by a user, wherein the event corresponds to an active volume in a storage layer of a system changing to an inactive volume;
create a discovery job in response to the event using the information provided by the user;
initiate the discovery job with a discovery collector; and
perform rediscovery of a device based upon the event and the information provided by the user using a protocol independent ontology model, wherein the device comprises a first one of an array in a storage layer, a switch in a network layer, a host in a compute layer, or a NAS device, wherein the array, switch, and host are accessed by different protocols,
wherein the device comprises an inactive volume in the storage layer and the rediscovery of the inactive volume is performed based on the event without rediscovering other volumes in a storage pool containing the inactive volume, and
wherein the event is modeled as a namespace in a resource data framework (RDF), and wherein the namespace refers to rediscovery of the inactive volume.

\* \* \* \* \*